US012472525B2

(12) United States Patent
Al-Jumaily et al.

(10) Patent No.: US 12,472,525 B2
(45) Date of Patent: Nov. 18, 2025

(54) STEPPED CYLINDRICAL PIEZOELECTRIC TRANSDUCER

(71) Applicant: AUT Ventures Limited, Auckland (NZ)

(72) Inventors: Ahmed Al-Jumaily, Auckland (NZ); Ata Meshkinzar, Auckland (NZ)

(73) Assignee: AUT Ventures Limited, Auckland (NZ)

( * ) Notice: Subject to any disclaimer, the term of this patent is extended or adjusted under 35 U.S.C. 154(b) by 960 days.

(21) Appl. No.: 16/765,624

(22) PCT Filed: Nov. 20, 2018

(86) PCT No.: PCT/NZ2018/050166

§ 371 (c)(1),
(2) Date: May 20, 2020

(87) PCT Pub. No.: WO2019/098861

PCT Pub. Date: May 23, 2019

(65) Prior Publication Data

US 2020/0276606 A1 Sep. 3, 2020

(30) Foreign Application Priority Data

Nov. 20, 2017 (NZ) ........................................ 737482

(51) Int. Cl.
*B05B 17/06* (2006.01)
*B06B 1/06* (2006.01)
(Continued)

(52) U.S. Cl.
CPC ........ *B05B 17/0607* (2013.01); *B06B 1/0655* (2013.01); *F24F 6/12* (2013.01);
(Continued)

(58) Field of Classification Search
CPC ... B05B 17/0607; B05B 17/06; B05B 17/063; B05B 17/0638; B05B 1/0655;
(Continued)

(56) References Cited

U.S. PATENT DOCUMENTS 3,527,650 A 9/1970 Block
4,395,719 A * 7/1983 Majewski .............. B41J 2/1429 417/322
(Continued)

FOREIGN PATENT DOCUMENTS

CN 201543963 U 8/2010
CN 102500502 A 6/2012
(Continued)

OTHER PUBLICATIONS

Foreign Communication From a Related Counterpart Application, International Preliminary Report on Patentability dated May 26, 2020, International Application No. PCT/NZ2018/050166 filed on Nov. 20, 2018.
(Continued)

*Primary Examiner* — Christopher R Dandridge
(74) *Attorney, Agent, or Firm* — Conley Rose, P.C.

(57) ABSTRACT

A cylindrical piezoelectric transducer is described the cylindrical piezoelectric transducer comprising: a tube having inner and outer surfaces and a first inner diameter, first outer diameter and a first thickness; at least one stepped band having a stepped inner diameter, stepped outer diameter and stepped thickness and wherein the stepped thickness is less than the first thickness and the at least one stepped bands are spaced along the length of the tube and alternate with bands of the first thickness; and conductive material disposed over the inner and outer surfaces of the tube.

20 Claims, 15 Drawing Sheets

(51) Int. Cl.
*F24F 6/12* (2006.01)
*H04R 17/00* (2006.01)
*A23B 11/16* (2025.01)

(52) U.S. Cl.
CPC ............ *H04R 17/00* (2013.01); *A23B 11/162* (2025.01); *B06B 2201/77* (2013.01)

(58) Field of Classification Search
CPC . B05B 14/10; F24F 6/12; H04R 17/00; A23C 3/073; B06B 2201/77
See application file for complete search history.

(56) References Cited

U.S. PATENT DOCUMENTS

| | | | | |
|---|---|---|---|---|
| 4,993,411 | A | 2/1991 | Callaway | |
| 6,208,065 | B1 | 3/2001 | Ueyama | |
| 7,802,569 | B2 | 9/2010 | Yeates et al. | |
| 9,533,323 | B2 | 1/2017 | Sauzade | |
| 2003/0048038 | A1 | 3/2003 | Tsai | |
| 2003/0205229 | A1 | 11/2003 | Crockford et al. | |
| 2009/0038932 | A1 * | 2/2009 | Denslow | B01F 25/50 204/157.15 |

FOREIGN PATENT DOCUMENTS

| | | | | |
|---|---|---|---|---|
| CN | 203263960 | U | 11/2013 | |
| CN | 205146560 | U | 4/2016 | |
| JP | 03224400 | A | 10/1991 | |
| JP | H03224400 | * | 10/1991 | G01S 7/52 |
| WO | 2008058941 | A1 | 5/2008 | |
| WO | WO-2010095421 | A1 * | 8/2010 | B05B 17/0607 |
| WO | 2019098861 | A1 | 5/2019 | |

OTHER PUBLICATIONS

Meshkinzar, A., et al., “Acoustic Amplification Utilizing Stepped-Thickness Piezoelectric Circular Cylindrical Shells”, Journal of Sound and Vibration, 2018, vol. 437, pp. 110-118.
Foreign Communication From a Related Counterpart Application, International Search Report and Written Opinion dated Feb. 6, 2019, International Application No. PCT/NZ2018/050166 filed on Nov. 20, 2018.
Al-Jumaily, A. M. et al., “On the Development of Focused Ultrasound Liquid Atomizers”, Advances in Acoustics and Vibration, Published Feb. 6, 2017, vol. 2017, pp. 1-10. Section 3 “Ultrasonic Transducers as Atomizers”, p. 4, line 8 to p. 7, line 5.

* cited by examiner

1910

1920

1901

2010

2020

2001

2110

2120

2101

2210

2220

2201

STEPPED CYLINDRICAL PIEZOELECTRIC TRANSDUCER

CROSS-REFERENCE TO RELATED APPLICATIONS

The present application is a filing under 35 U.S.C. 371 as the National Stage of International Application No. PCT/NZ2018/050166, filed Nov. 20, 2018, entitled "STEPPED CYLINDRICAL PIEZOELECTRIC TRANSDUCER," which claims priority to New Zealand Application No. 737482 filed with the Intellectual Property Office of New Zealand on Nov. 20, 2017, both of which are incorporated herein by reference in their entirety for all purposes.

FIELD

The invention relates to acoustic field generation and more particularly to a stepped cylindrical piezoelectric transducer.

BACKGROUND

In many biomedical, pharmaceutical and industrial applications, ultrasonic transducers can be used as atomizers. Humidifiers, micro/nano electronics, nanoparticles synthesis, spray coating, drug delivery, drug preparation for inhalation and others are among the most common applications of atomization for which ultrasonic transducers can be used. The shape and geometry of the transducer plays the most significant role in its performance. Various types of transducer geometries and shapes such as flat, curved and corrugated plates, cylindrical and spherical shells have been implemented for ultrasound generation.

To quantify the power and strength of the signal, it is essential to understand the vibration characteristics of a transducer. For example, vibrating plates can be used as ultrasonic radiators; however, the directivity of the generated acoustic waves is also important. The radiations from different parts of a simple flat plate with constant thickness are in counter phase leading to phase cancellation and therefore, poor directivity. On the contrary, if one considers a plate with some steps on the surface raised half a wavelength of the radiated wave, the radiations become in phase and directivity increases. Some attempts have been made to increase the focus and directivity by means of curved structures.

A corrugated PVDF film air transducer was reported to achieve a high-power output and a sharp beam angle. Further, an array of transducers was circularly positioned in such a way that the signal amplitude at the focal line of the array gets maximized and was reported to have a sound pressure level of 142.70 dB SPL.

A conductive cylinder externally driven by a piezoelectric composite transducer at ultrasound levels produced an average sound pressure level of 154.3 dB using 75Watts. The conductor may be metallic or other conductors may be used such as conductive polymers. The aim was to produce an ultrasonic field for drying foodstuff. Such a system needs an expensive and large power amplifier and dynamic resonance controller which are expensive.

A system and method to generate focused ultrasonic waves with high intensity is desired. Although an array of transducers positioned in a circular form may be helpful, small changes in the spatial position of the transducers (0.5 mm at frequencies around 100 kHz) can have a significant effect on the signal at the focal line. Hence, it imposes a barrier for downsizing or upsizing the transducer for various purposes. Further, the conductive cylindrical tube driven by a piezoelectric transducer needs an expensive and bulky power driver. Therefore, none of the available approaches to produce high intensity focused ultrasonic field are suitable.

Stepped-thickness tubes have been investigated for the mode of deformation under quasi-static and dynamic loading conditions and it was concluded that machining can effectively localize the deformation within thin regions. The vibration characteristics of circular tubes with circumferential or axial steps have also been investigated. It was concluded that the geometry of stepped shells makes the mode shapes more pronounced and localized near the thinner regions. The ultrasound generation capability of the tubes has not been investigated. While it is known that stepped-thickness plates can increase the strength and directivity of the acoustic field, no work has been carried out on a stepped-thickness piezoelectric cylindrical tube. There is no suggestion that the use of stepped tubes had the potential to create intense ultrasonic fields inside the tubes.

Plate transducers are used to eject droplets from the planar surface of a liquid which is in contact with the plate. However it would be desirable for ultrasonic waves have to travel through another (gas) sound conductor (air) before reaching the target of the waves (for droplet generation).

Further, it would be desirable for that the created droplets are not ejected from a liquid surface, but created by shattering existing (nominally spherical, definitely non-planar) droplets.

What is needed is an economical ultrasonic transducer able to generate a strong focused acoustic field. The proposed invention uses a stepped piezoelectric cylindrical transducer driven by a small piezo driver that is capable of achieving high levels of sound pressure.

Accordingly, it is an object of the invention to provide a stepped cylindrical piezoelectric transducer that overcomes the above disadvantages or to at least provide the public or industry with a useful choice

SUMMARY

According to another example embodiment there is provided a cylindrical piezoelectric transducer comprising:

- a tube having inner and outer surfaces and a first inner diameter, first outer diameter and a first thickness;
- at least one stepped band having a stepped inner diameter, stepped outer diameter and stepped thickness and wherein the stepped thickness is less than the first thickness and the at least one stepped band is spaced along the length of the tube and alternate with bands of the first thickness; and
- a conductive layer disposed over the inner and outer surfaces of the tube.

Preferably the at least one stepped band is a plurality of stepped bands.

Preferably the outer diameter of the stepped bands is less than the first outer diameter.

Preferably the inner diameter of the bands of the inner diameter of the stepped bands is greater than the first inner diameter.

Preferably there are at least two bands of a first thickness and at least one band of the stepped thickness.

Preferably there are three bands of a first thickness and two bands of the stepped thickness.

Preferably further comprising a liner in the inner of the tube.

According to a further example embodiment there is provided a method of atomizing a liquid comprising using the cylindrical piezoelectric transducer to reduce the size of liquid droplets.

Preferably the liquid is water.

According to a yet further example embodiment there is provided a method of pasteurisation comprising using the cylindrical piezoelectric transducer to pasteurise a liquid.

Preferably the liquid is milk.

According to a still further example embodiment there is provided a humidifier comprising the cylindrical piezoelectric transducer.

According to one example embodiment there is provided a method for making a stepped piezoelectric transducer having a plurality of stepped bands comprising:

creating at least one stepped band in a tubular piezoelectric transducer of a first inner diameter, first outer diameter and first thickness such that the thickness of the at least one stepped band is less than the first thickness, the stepped band spaced along the length of the tubular piezoelectric transducer and alternating with bands of the first thickness.

Preferably the at least one stepped band is a plurality of stepped bands.

Preferably the stepped bands are created by adding material to the tubular piezoelectric transducer.

Alternatively wherein the stepped bands are created by machining; and further comprising the step of coating the machined steps with a conductive layer.

Preferably machining of the stepped bands further comprises machining the stepped bands such that the outer diameter of the stepped bands is less than the first outer diameter.

Preferably machining of the stepped bands further comprises machining the stepped bands such that the inner diameter of the stepped bands is greater than the first inner diameter.

Preferably there are at least two bands of a first thickness and at least one band of the stepped thickness.

Preferably there are three bands of a first thickness and two bands of the stepped thickness.

Preferably the tubular piezoelectric transducer has an inner surface and the method further comprises lining the inner surface.

According to a yet further example embodiment there is provided a cylindrical piezoelectric transducer comprising:

a tube having inner and outer surfaces and a first inner diameter, first outer diameter and a first thickness;

at least one stepped band having a stepped inner diameter, stepped outer diameter and stepped thickness and wherein at least one of the stepped inner diameter, stepped outer diameter and stepped thickness differ from the respective first inner diameter, first outer diameter and first thickness; and a conductive layer disposed over the inner and outer surfaces of the tube.

Preferably the at least one stepped band is a plurality of stepped bands.

Preferably the stepped inner diameter differs from the first inner diameter.

Preferably the stepped outer diameter differs from the first outer diameter.

Preferably the stepped thickness differs from the first thickness.

Preferably further comprising a liner in the inner of the tube.

According to a yet further example embodiment there is provided a method of atomizing a liquid comprising using the cylindrical piezoelectric transducer to reduce the size of liquid droplets.

Preferably the liquid is water.

According to a yet further example embodiment there is provided a method of pasteurisation comprising using the cylindrical piezoelectric transducer to pasteurise a liquid.

Preferably the liquid is milk.

According to a still further example embodiment there is provided humidifier comprising the cylindrical piezoelectric transducer.

According to a still further example embodiment there is provided a method for making a stepped piezoelectric transducer having a plurality of stepped bands comprising:

creating at least one stepped band in a tubular piezoelectric transducer of a first inner diameter, first outer diameter and first thickness such that the stepped band has a stepped inner diameter, stepped outer diameter and stepped thickness and wherein at least one of the stepped inner diameter, stepped outer diameter and stepped thickness differ from the respective first inner diameter, first outer diameter and first thickness.

Preferably the at least one stepped band is a plurality of stepped bands.

Preferably the stepped inner diameter differs from the first inner diameter.

Preferably the stepped outer diameter differs from the first outer diameter.

Preferably the stepped thickness differs from the first thickness.

Preferably the tubular piezoelectric transducer has an inner surface and the method further comprises lining the inner surface.

According to a yet further example embodiment there is provided an apparatus for creating a plurality of liquid droplets comprising:

a droplet generator; and the cylindrical piezoelectric transducer, wherein the droplets from the droplet generator are feed through the cylindrical piezoelectric transducer and are reduced in size.

Preferably the droplet generator is selected from the group comprising example a plate atomizer, mesh nebulizer and a spray nozzle.

Preferably further comprising at least one further cylindrical piezoelectric transducer, each of the at least one further cylindrical piezoelectric transducers being arranged in series with the outlet of a previous cylindrical piezoelectric transducers being feed into a further cylindrical piezoelectric transducers.

Preferably the number of the at least one further cylindrical piezoelectric transducers is selected based on the desired droplet size.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art, validly combinable with other documents or that it forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention, in which.

DETAILED DESCRIPTION

Figure 1:
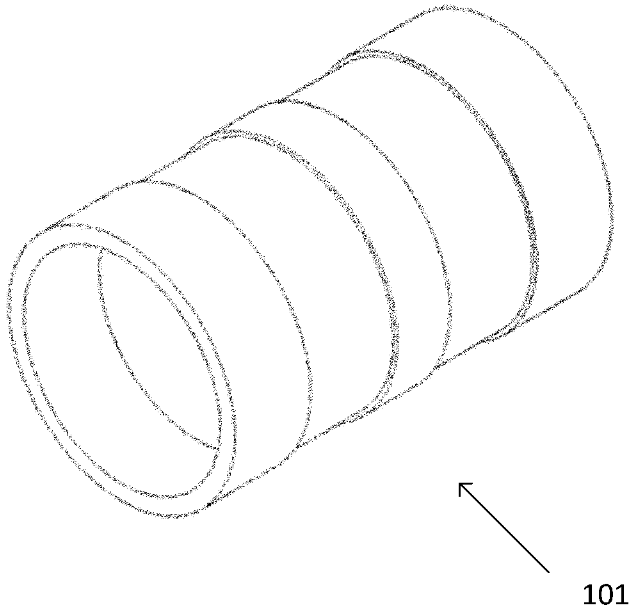
FIG. 1 is an isometric view of an exemplary stepped thickness cylindrical piezoelectric transducer.
Figure 2:
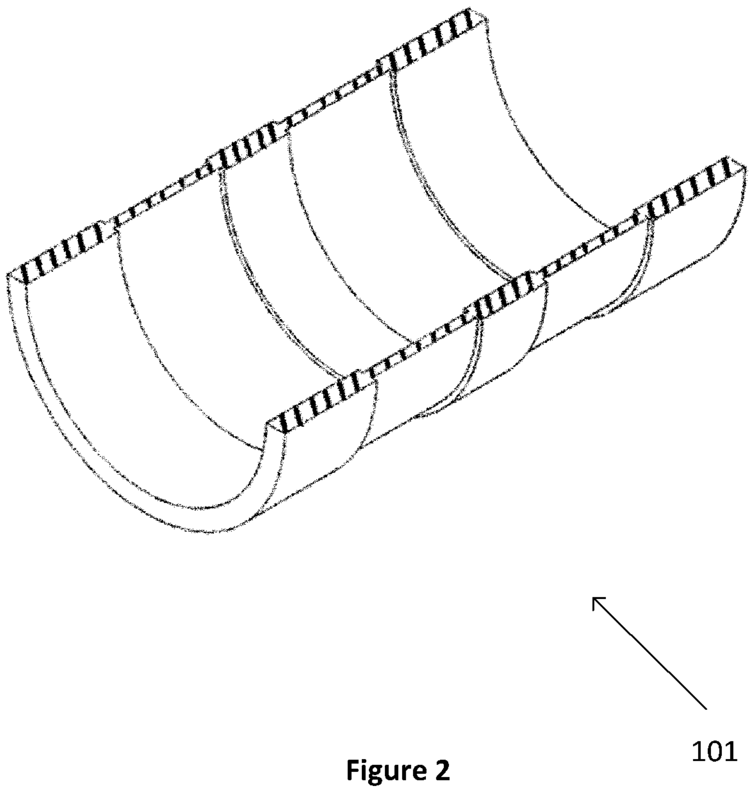
FIG. 2 is an isometric cut view of an exemplary stepped thickness cylindrical piezoelectric transducer of FIG. 1, along the line A-A of FIG. 5.
Figure 3:
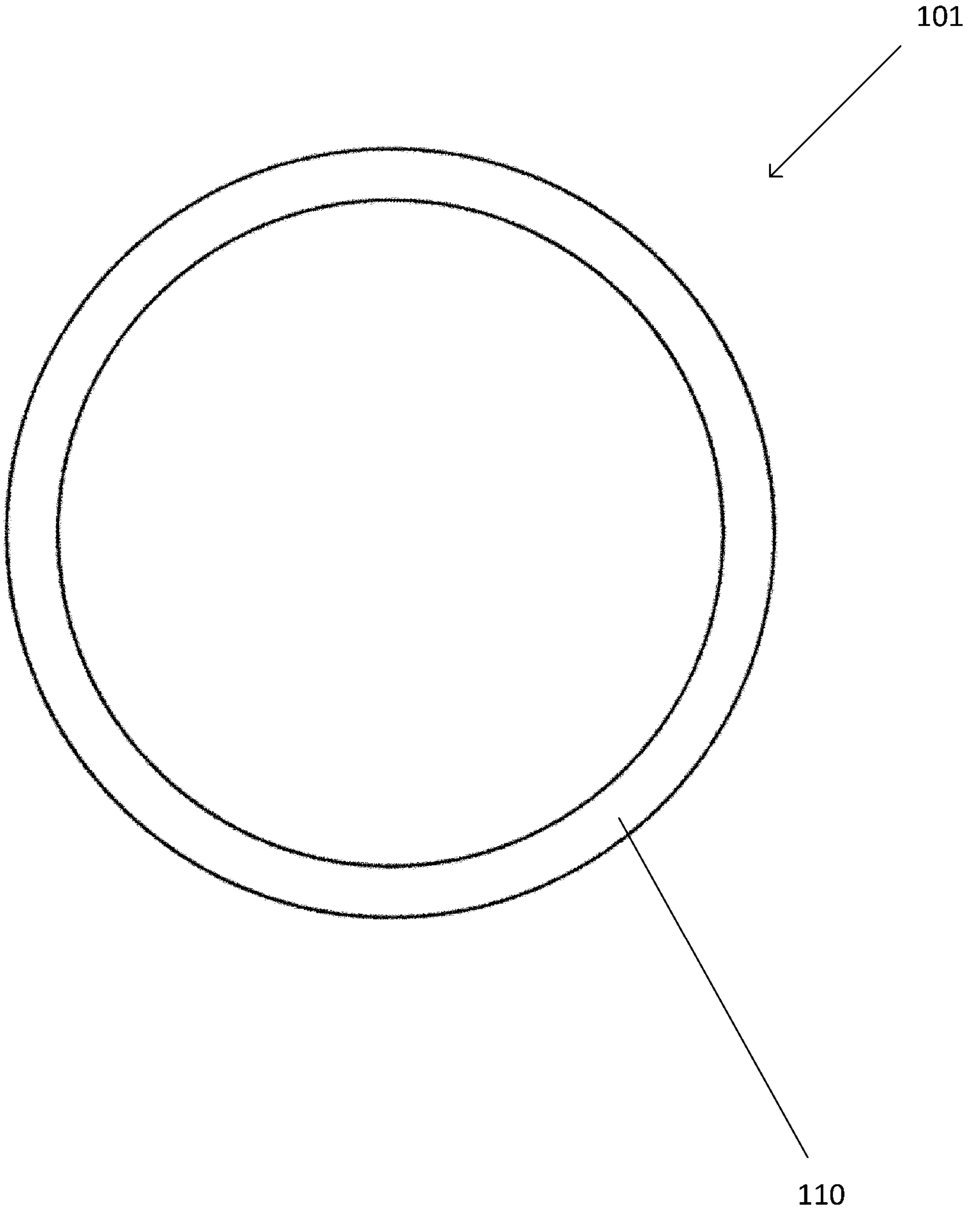
FIG. 3 is an end view of an exemplary stepped thickness cylindrical piezoelectric transducer of FIG. 1.
Figure 4:
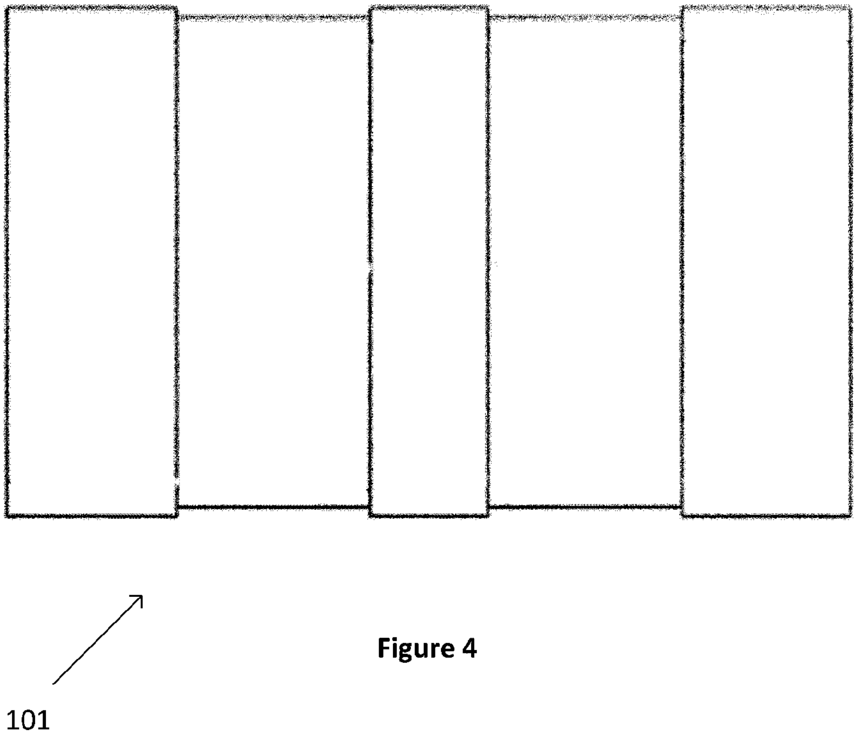
FIG. 4 is a side view of an exemplary stepped thickness cylindrical piezoelectric transducer of FIG. 1.
Figure 5:
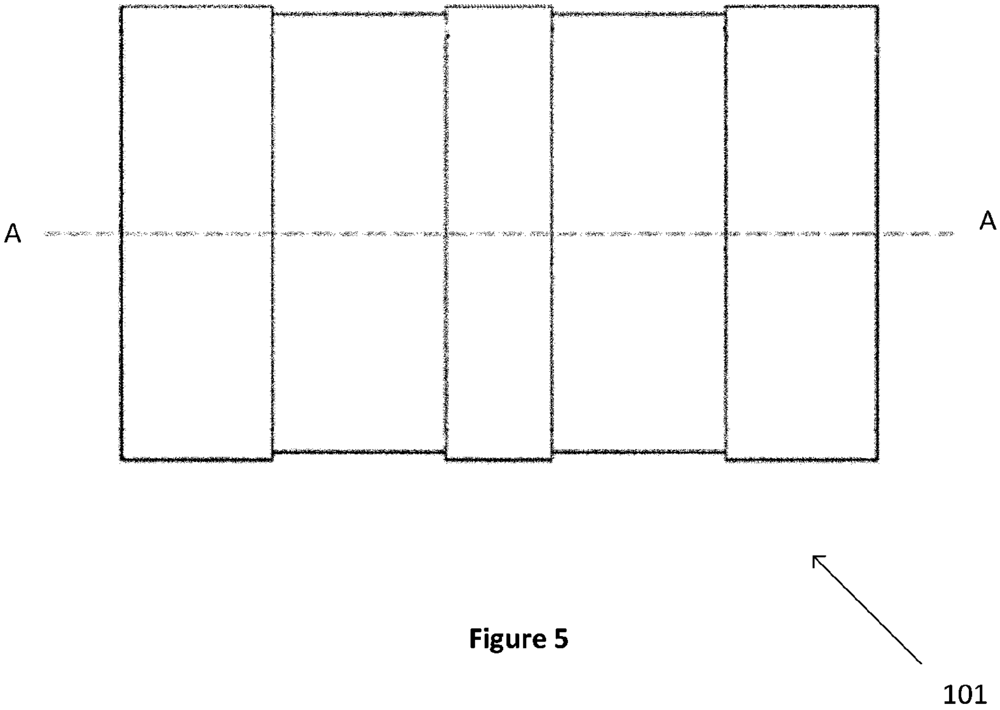
FIG. 5 is a top view of an exemplary stepped thickness cylindrical piezoelectric transducer of FIG. 1.

FIG. 1 illustrates a cylindrical piezoelectric transducer 101 according to an example embodiment.

In an exemplary embodiment, the applicant utilized a PZT-5L piezoelectric cylindrical transducer purchased from Nanjing Hanzhou Technologie CO., LTD in China. Dimensions of the transducer are 30 mm outside diameter, 26 mm inner diameter and 50 mm length of the tube. The radial mode vibration resonance frequency according to the manufacturer is 37±10% KHz. It has silver electrodes on both inner and outer surfaces.

To produce the transducer of the present invention the applicant started with the purchased uniform-thickness transducer and machined half a millimeter from each of the inner and outer surfaces to get 1 mm of wall thickness within grooved spaces. Because machining destroyed the electrode layers within the grooved regions, very thin layers of silver epoxy (approx. 50 μm) are used to coat these areas.

While the transducer could be machined, a transducer with steps could be created by mounding a suitable transducer during manufacturing, adding material to the inner or outer surfaces or pressing a sleeve into the inner of the tube of pressing a sleeve onto the outer surface of the transducer 101. In some embodiments a liner may also be added to line the transducer 101. The liner may protect the transducer from the liquid being passed through the transducer. In some embodiments the steps may be integrated into the liners in addition to or instead of the steps that are machine/molded or otherwise added to the transducer.

The stepped-thickness transducer 101 is shown in FIGS. 1 to 7. The location of the grooves was evaluated based on simulation results performed by ANSYS software to enable a higher level of sound pressure to be achieved.

Figure 6:
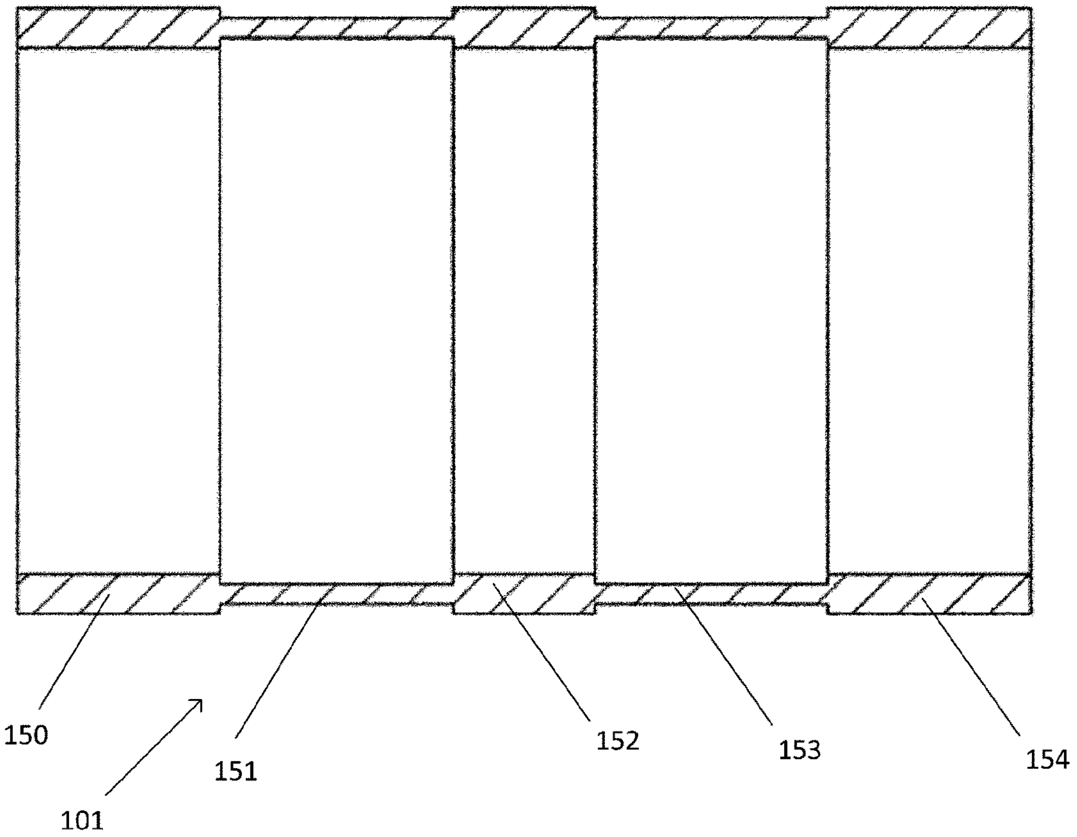
FIG. 6 is a side cross sectional view of an exemplary stepped thickness cylindrical piezoelectric transducer of FIG. 1 along the line A-A of FIG. 5.

Referring to FIG. 6 the stepped thickness can be seen, bands 150, 152 and 154 have a smaller inside diameter than bands 151 and 153. Further the thickness of the material of bands 150, 152, and 154 is thicker than bands 151 and 153.

Figure 7:
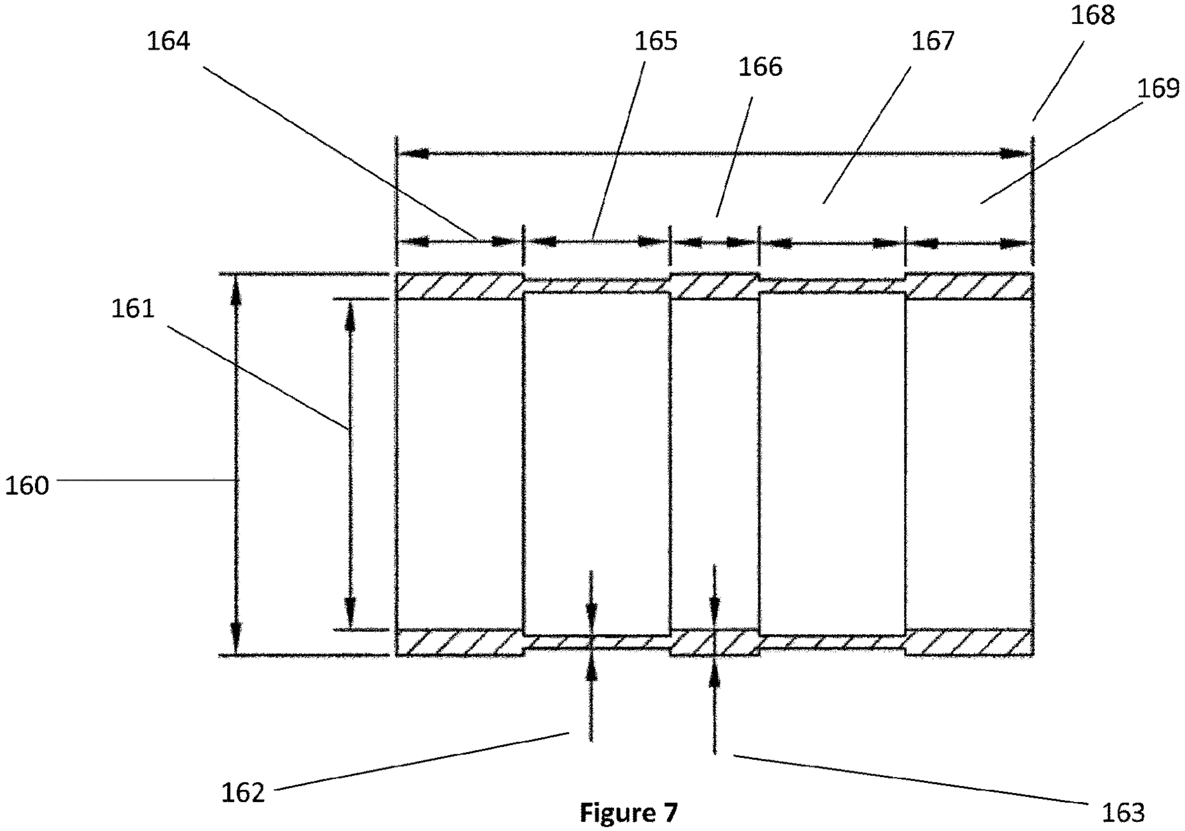
FIG. 7 is a further side cross sectional view of an exemplary stepped thickness cylindrical piezoelectric transducer of FIG. 1 along the line A-A of FIG. 5.

The geometrical dimensions of an example stepped-thickness transducer are depicted in FIG. 7. The length of the example transducer 168 is 50 mm, the outside diameter 160 is 30 mm, while the inside diameter 161 is 26 mm. The width of the first band 164 is 10 mm, the second band 165 is 11.5 mm, the third band 166 is 7 mm, the fourth band 167 is 11.5 mm and the fifth band 169 is 10 mm. The thickness of the second and fourth bands 162 is 1 mm, while the thickness of bands one, three, and five 163 is 2 mm.

Figure 8:
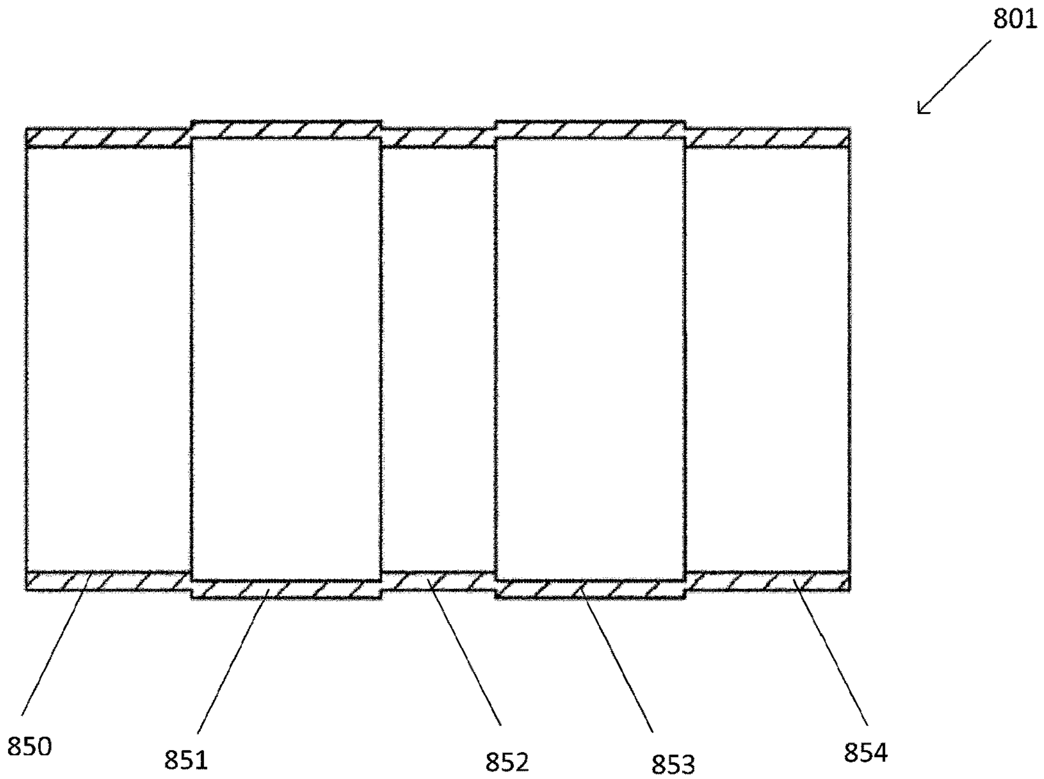
FIG. 8 is a side cross sectional view of an alternative exemplary stepped thickness cylindrical piezoelectric transducer.

Alternative embodiments are illustrated in FIGS. 8 to 13. Referring to FIG. 8 an alternative embodiment of the transducer 801 can be seen, the stepped bands 850, 852 and 854 have a smaller inside diameter than bands 851 and 853. In this embodiment, the thickness of the material of bands is the same for all bands 850, 851, 852, 853, 854.

Figure 9:
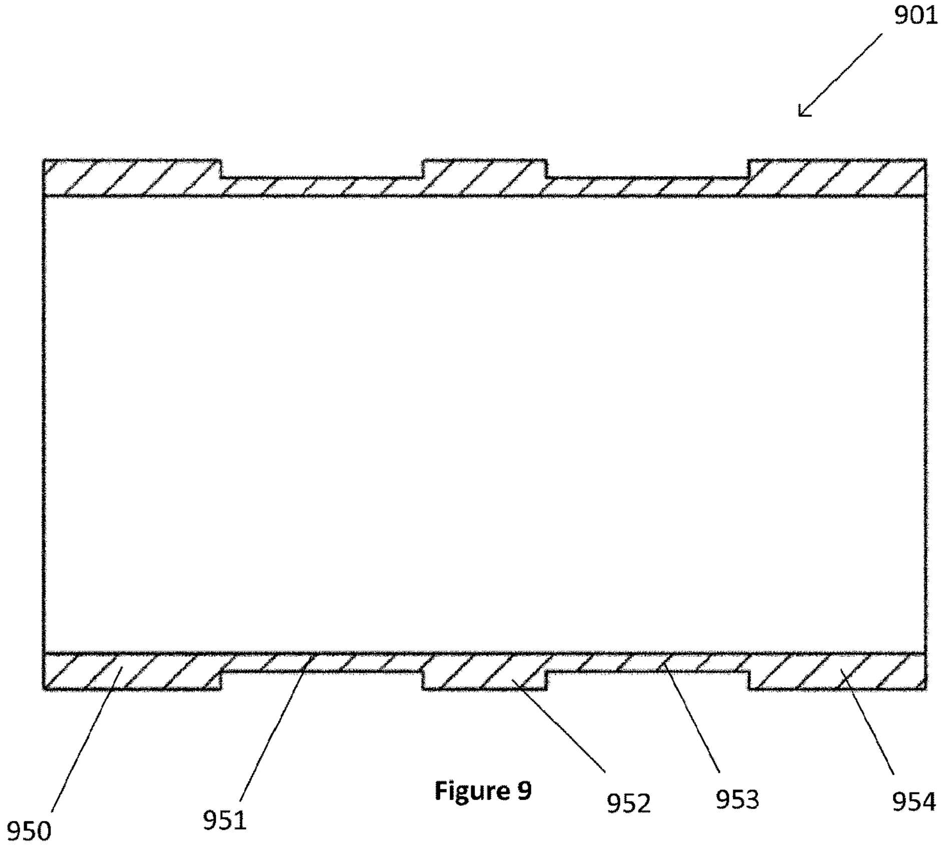
FIG. 9 is a side cross sectional view of an alternative exemplary stepped thickness cylindrical piezoelectric transducer.

Referring to FIG. 9 an alternative embodiment of the transducer 901 can be seen, the stepped bands 951 and 953 have a smaller outside diameter than bands 950, 952 and 954. In this embodiment, the thickness of the material of bands is the same for bands 950, 952, and 954 while bands 951 and 953 are the same as each other but the thickness is smaller than bands 950, 952, and 954.

Figure 10:
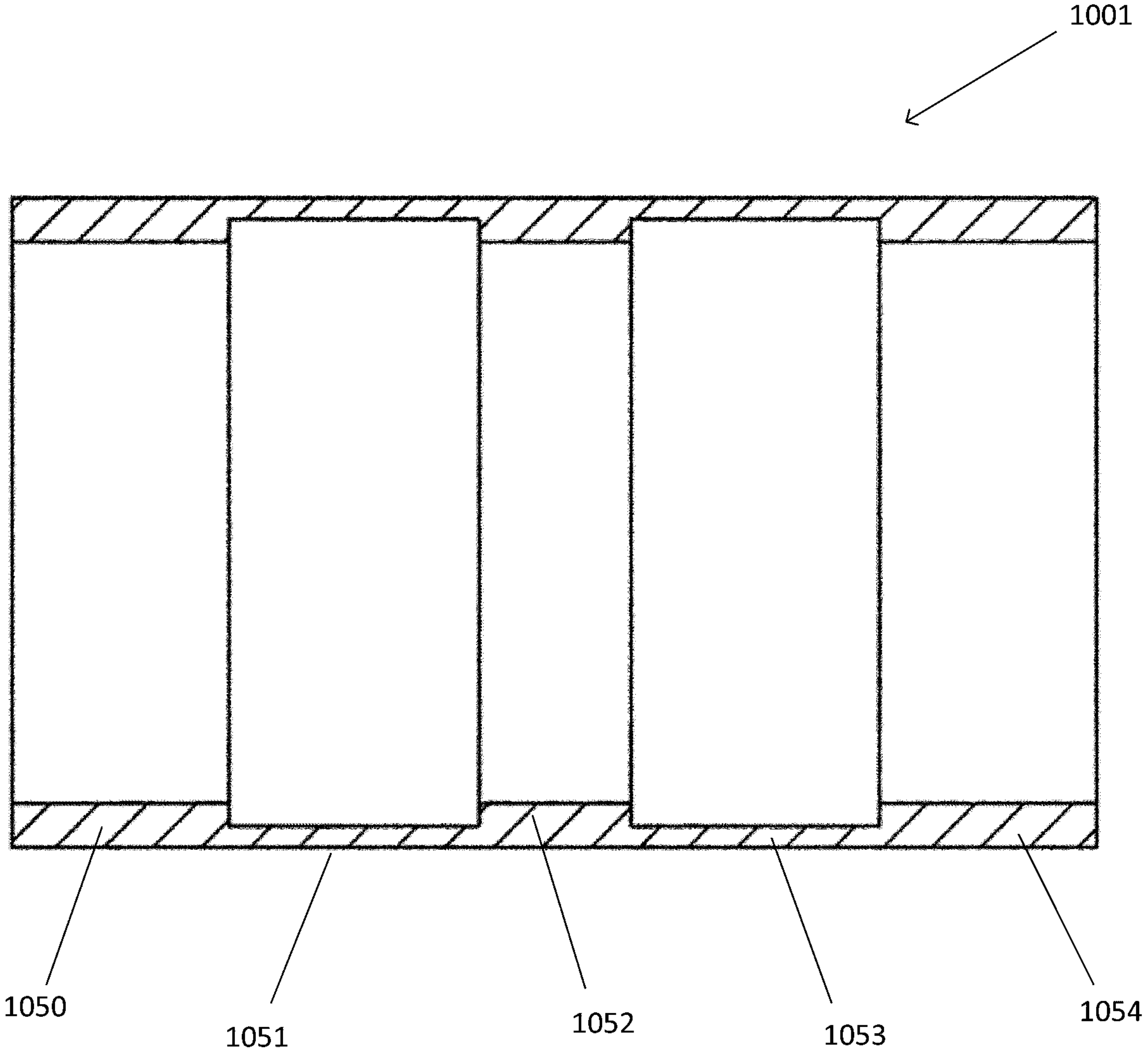
FIG. 10 is a side cross sectional view of an alternative exemplary stepped thickness cylindrical piezoelectric transducer.

Referring to FIG. 10 an alternative embodiment of the transducer 1001 can be seen, the stepped bands 1050, 1052 and 1054 have a smaller inside diameter than bands 1051 and 1053. In this embodiment, the thickness of the material of bands is the same for bands 1050, 1052, and 1054 while bands 1051 and 1053 are the same as each other but smaller than bands 1050, 1052, and 1054.

Figure 11:
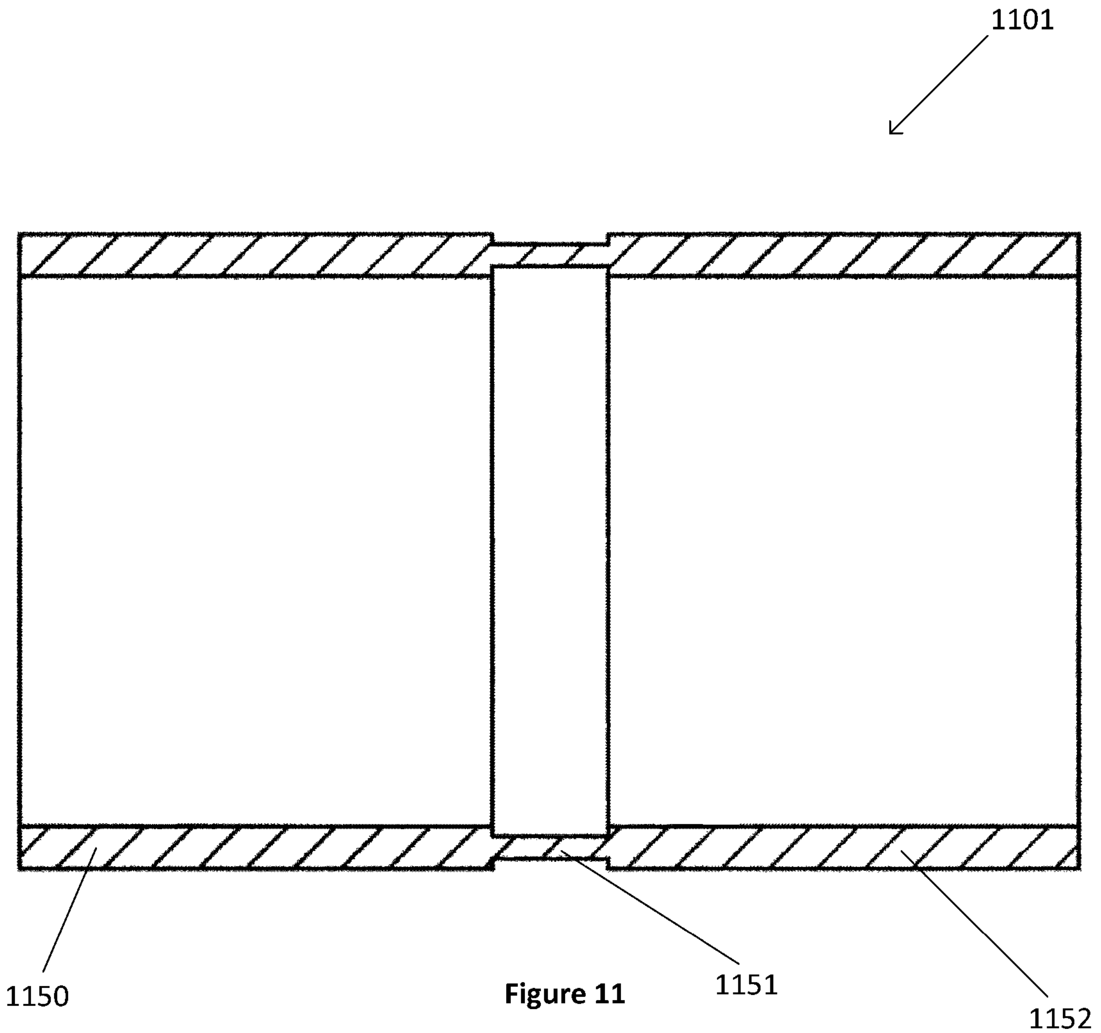
FIG. 11 is a side cross sectional view of an alternative exemplary stepped thickness cylindrical piezoelectric transducer.

Referring to FIG. 11 an alternative embodiment of the transducer 1101 can be seen, the stepped bands 1150 and 1152 have a smaller inside diameter than band 1151 and a larger outside diameter than band 1151. In this embodiment, the thickness of the material of bands is the same for bands 1150 and 1152 while the thickness of band 1151 is smaller than bands 1150 and 1152.

Figure 12:
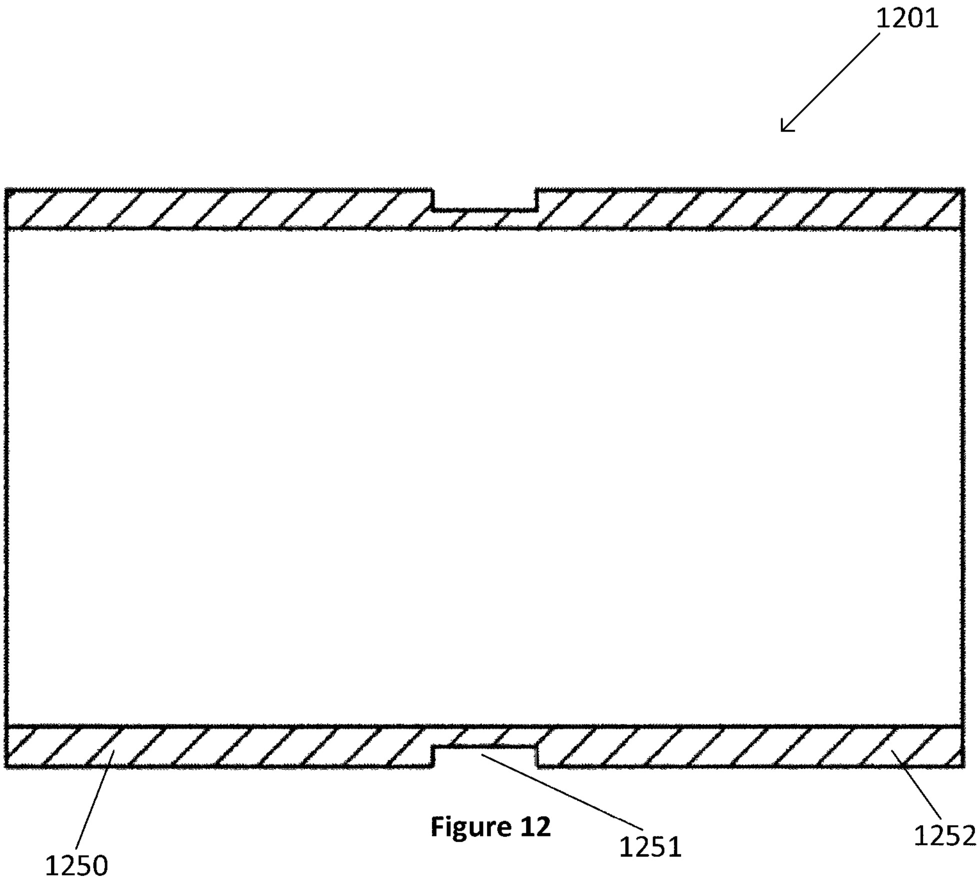
FIG. 12 is a side cross sectional view of an alternative exemplary stepped thickness cylindrical piezoelectric transducer.

Referring to FIG. 12 an alternative embodiment of the transducer 1201 can be seen, the stepped band 1251 has a smaller outside diameter than bands 1250, and 1252. In this embodiment, the thickness of the material of bands is the same for bands 1250 and 1252 while the thickness of band 1251 is smaller than bands 1250 and 1252.

Figure 13:
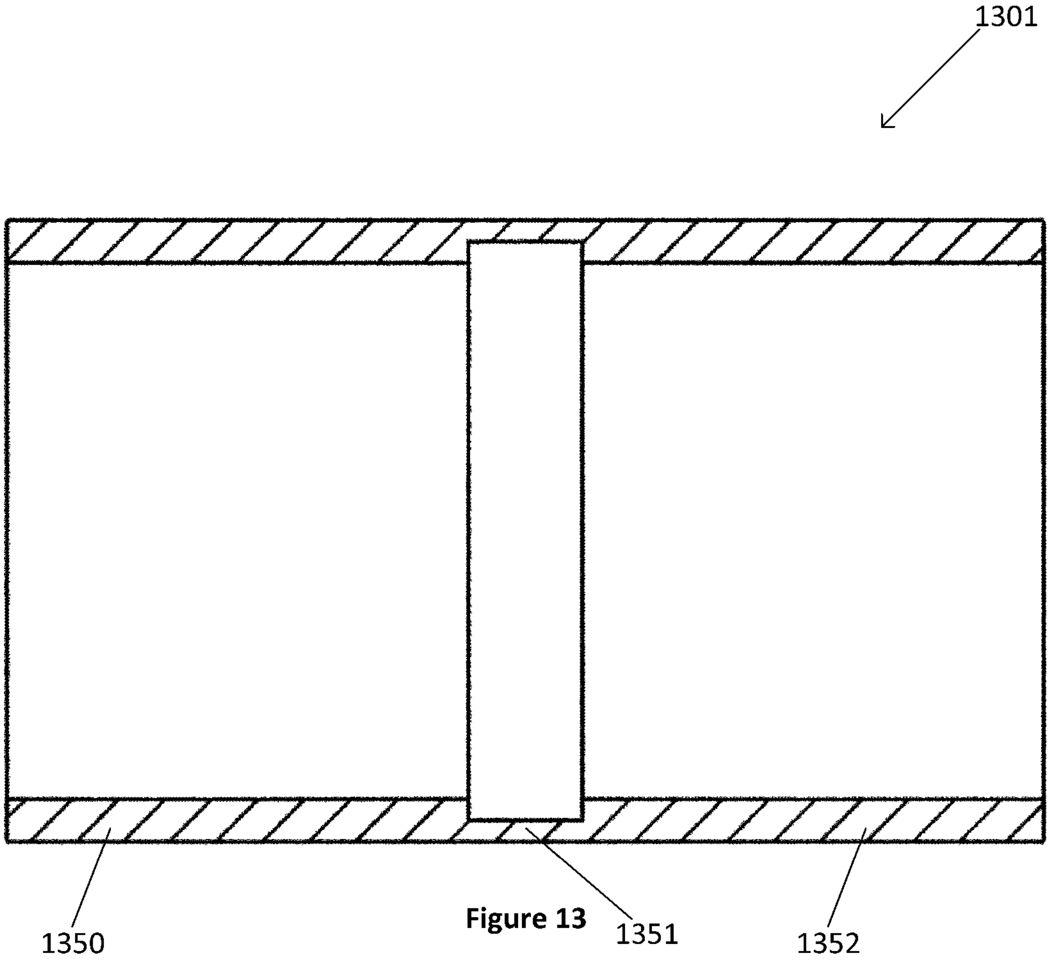
FIG. 13 is a side cross sectional view of an alternative exemplary stepped thickness cylindrical piezoelectric transducer.

Referring to FIG. 13 an alternative embodiment of the transducer 1301 can be seen, the stepped bands 1350 and 1352 have a smaller inside diameter than band 1351. In this embodiment, the thickness of the material of bands is the same for bands 1350, and 1352 while band 1351 is smaller than bands 1350, and 1352. The outside diameter of the stepped bands 1350 and 1352 is the same as the outsider diameter of the band 1351.

As can be seen from the various alternative embodiments the number of bands can vary from at least one while the inner and outer diameter can also vary.

Figure 15:
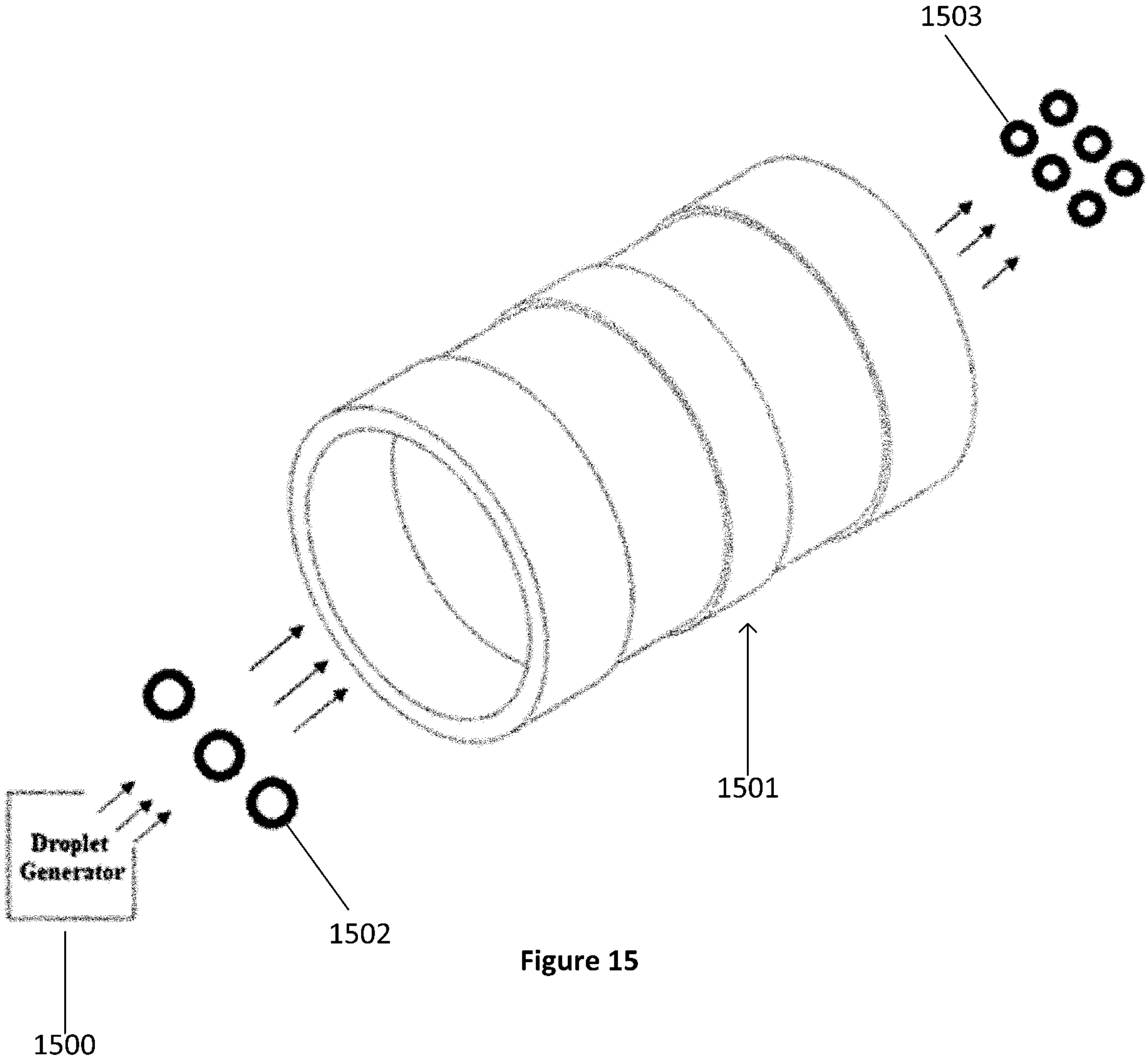
FIG. 15 is a view of an exemplary stepped thickness cylindrical piezoelectric transducer used in conjunction with a droplet generator.
Figure 16:
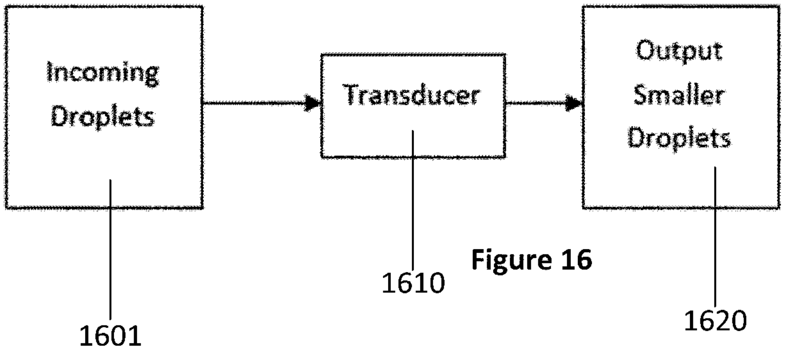
FIG. 16 is a schematic of flow using an ultrasonic transducer to produce smaller droplets.

Referring to FIG. 15 the transducer 1501 can be used to reduce the size of existing droplets 1502. A droplet generator 1500 creates droplets of a first size 1502 and the transducer 1501 using the produced acoustic field created reduces the sizes of the outgoing droplets 1503. Any suitable droplet generator 1500 could be used, for example a plate atomizer, mesh nebulizer or a spray nozzle. A method of reducing the size of droplets can be seen in FIG. 16. Incoming droplets 1601 of a first size are passed through a transducer 1610 and smaller droplets are produced 1620. It is further envisaged that a plurality of transducers could be used in series depending on the desired droplet size distribution required.

In order to identify suitable dimensions of the stepped thickness transducer, it is first required to investigate the uniform thickness tube. Governing equations for vibration of circular cylindrical shells together with piezoelectric constitutive equations should be used. These equations can be solved using a numerical technique such as Finite Difference or Finite Element Method. However, available commercial software such as ANSYS or ABAQUS can be used to solve the equations. Accordingly, frequencies and mode shapes of vibration will be obtained. Taking the mode shape into account, one will be able to identify the number, location and length of the steps. One will need to select mode shapes that have regions in counter-phase axially such as modes with axial wave numbers of three and five.

These steps are designed in an attempt to produce thin acoustic amplification regions between them where the counter-phase radiation is eliminated or diminished from the thick steps. Therefore, the regions to be machined can be identified for any transducer of arbitrary size and dimensions. The idea is to machine the area between each two consecutive in-phase regions in order to localize the vibration within those thin areas and achieve higher vibration amplitude. Depth of the grooves should be identified in such a way to have maximum constructive interference of the waves radiating from different points around the circumference. This can happen if the inner radius of the grooved region is an odd multiplier of the quarter wavelength of the radiated wave at that frequency. All these result in maximum acoustic amplification within the step boundaries along the transducer center line.

Figure 14:
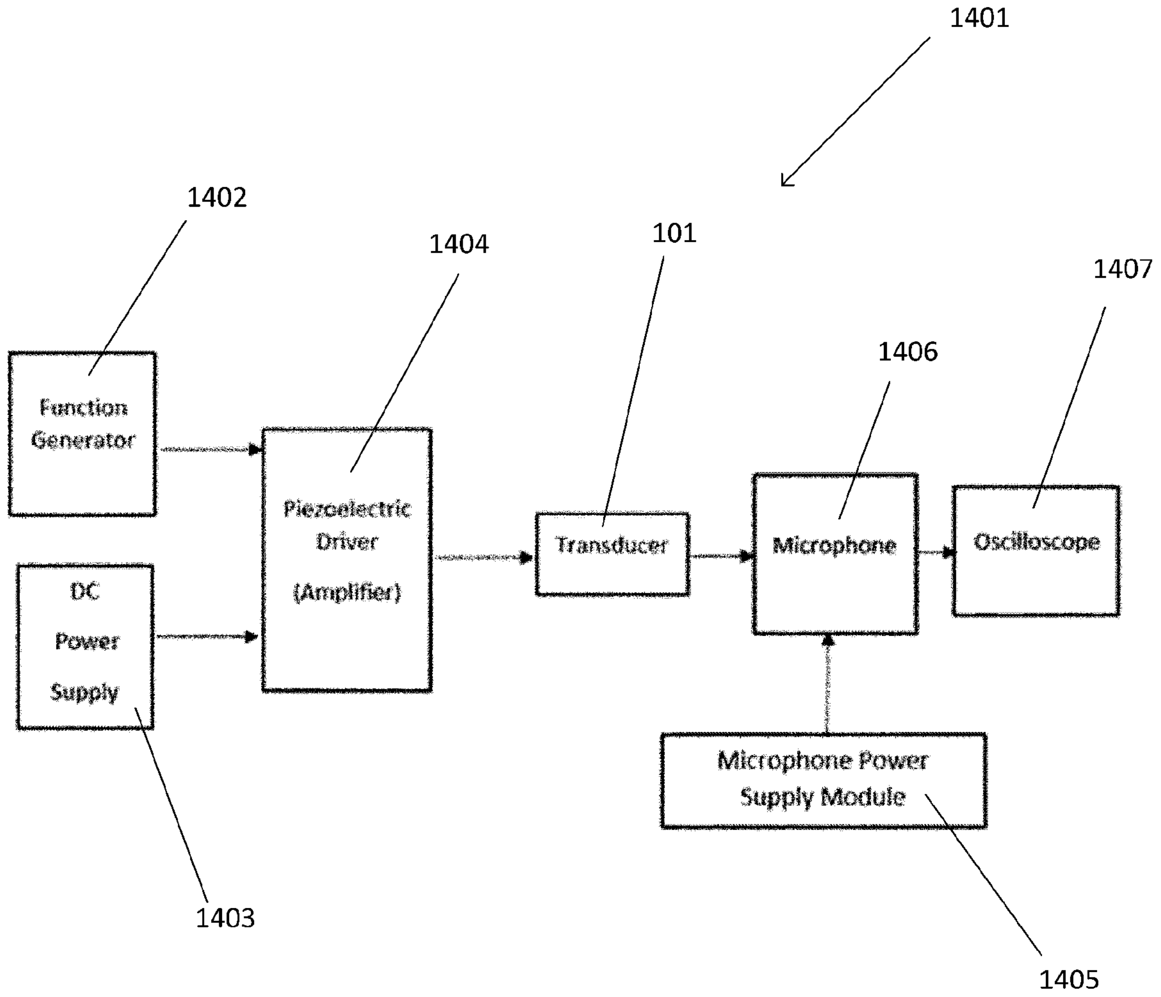
FIG. 14 is a schematic of a setup for testing the ultrasonic transducers.

The applicant conducted experiments on the standard piezoelectric cylindrical transducer and the stepped piezoelectric cylindrical transducer 101 of the invention. The transducers 101 were connected to a piezo driver 1404 to create the test setup 1401 as in FIG. 14. The piezo driver used was a MX200 200V 1A purchased from Micromechatronics, Inc, PA, USA. It is a complete power supply and high-performance linear voltage amplifier module for driving piezoelectric transducers. The voltage gain of this amplifier is 20 and it works within three ranges of 100V, 150V and 200V depending on the need and the jumper settings on the PCB board.

The other devices used for testing were a function generator 1402, a DC Power Supply 1403 and an oscilloscope 1407. The models used are TTi TG550 function generator and Tektronix TBS1062 oscilloscope, but other generators and oscilloscopes could be used.

A G.R.A.S. 46DD ⅛" CCP Pressure Standard Microphone Set 1406 with 12AL G.R.A.S CCP Power Supply module 1405 were also used. Again, other microphone sets, and power supply modules could be used.

The microphone is inserted so that it does not touch the wall of the transducer. The microphone is driven by a CCP Power Supply and the output of the microphone is connected to the oscilloscope. The output of the microphone is voltage which can be converted to the sound pressure level in dB using the formula:

$$\text{Sound pressure level (dB)}=8.68591\ \ln(x)+100.02 \tag{1}$$

where 'x' is the output of the microphone read from the oscilloscope screen in mV.

Further, the output sound pressure level in dB obtained from equation (1) can be used to evaluate the root mean square of the output sound pressure, prms, in Pascal (Pa).

$$\text{Sound pressure level (dB)}=20\ \log\ prms+94 \tag{2}$$

Tests on Uniform Thickness Piezoelectric Tube

Figure 17:
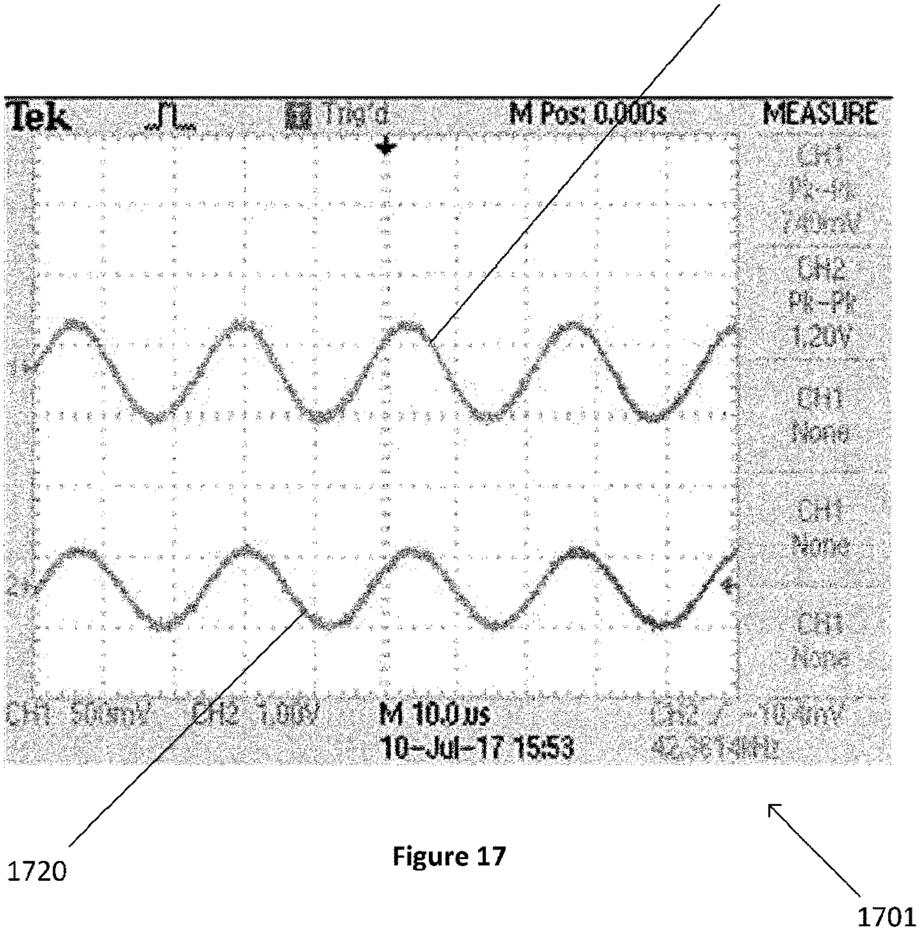
FIG. 17 is an image of an oscilloscope screen when testing the uniform-thickness transducer at 24V excitation voltage and 42.36 KHz where channel one shows the output signal of the microphone and channel two is the input excitation voltage.

In FIG. 17, an image of an oscilloscope screen 1701 is shown, the input voltage to the amplifier is 1.20V 1720 (Channel 2 of the oscilloscope) which equals 24V applied to the transducer because of the gain of the amplifier which is 20. The output of the microphone 1710 (Channel 1 of the oscilloscope) in this case is 740 mV. It is worth noting that this value is not fixed and fluctuates as the transducer vibrates, yet the variation is within a range of a few millivolts. Using Equation (1) the output is 157.40 dB corresponding to the pressure of 1479.11 Pa using equation (2). The average output current of the piezo driver for the selected voltage jumper was 250 mA according to its catalog and the applied voltage was 24V peak-to-peak corresponding to 16.968V root mean square. Therefore, the average power delivered to the transducer will be approx. 3 Watts.

Figure 18:
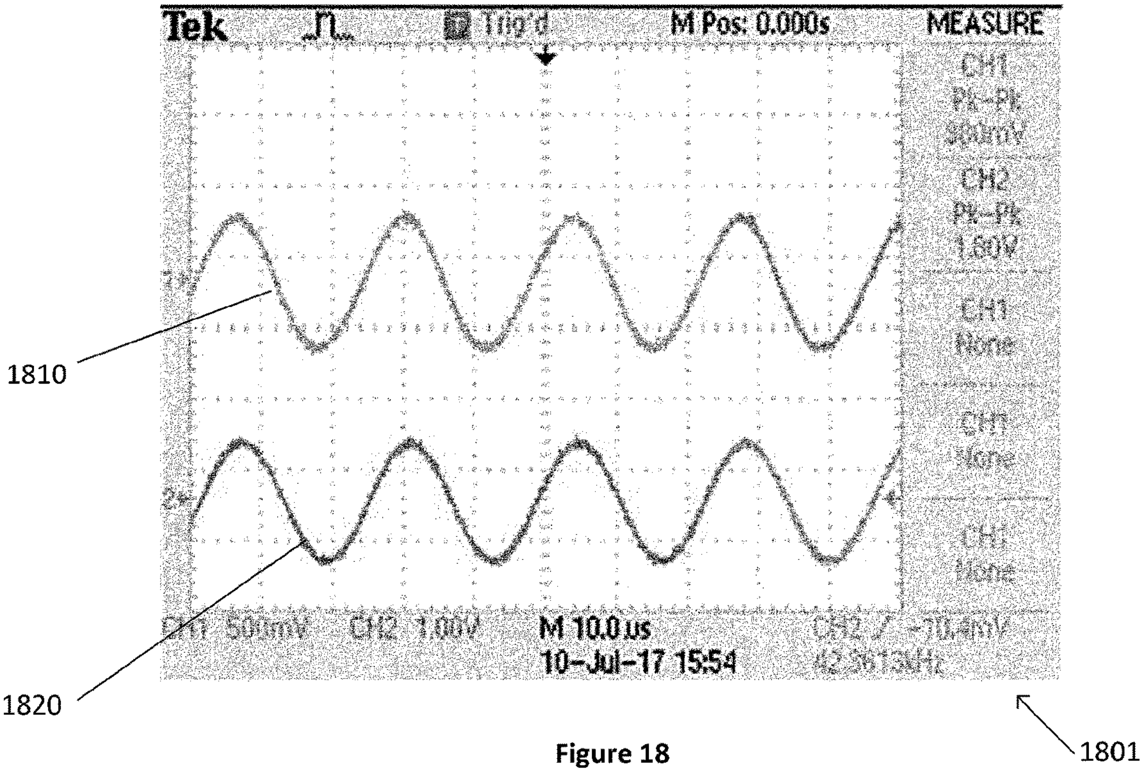
FIG. 18 is an image of an oscilloscope screen when testing the uniform-thickness transducer at 36V excitation voltage and 42.36 KHz where channel one shows the output signal of the microphone and channel two is the input excitation voltage.

In FIG. 18, an image of an oscilloscope screen 1801 is shown, the input voltage 1820 to the amplifier is 1.80V (Channel 2 of the oscilloscope) which equals 36V applied to the transducer because of the gain of the amplifier which is 20. The output of the microphone 1810 (Channel 1 of the oscilloscope) in this case is 980 mV. Using Equation (1) the output is 159.84 dB corresponding to the pressure of 1958.84 Pa using equation (2). The average output current of the piezo driver for the selected voltage jumper was 250 mA according to its catalog and the applied voltage was 36V peak-to-peak corresponding to 25.452V root mean square. Therefore, the average power delivered to the transducer will be approx. 4.5 Watts.

Comparing FIGS. 17 and 18, reveals that variations in the excitation voltage slightly affect the output sound pressure level within the range of a few decibels. The power consumption will be affected as well.

Figure 19:
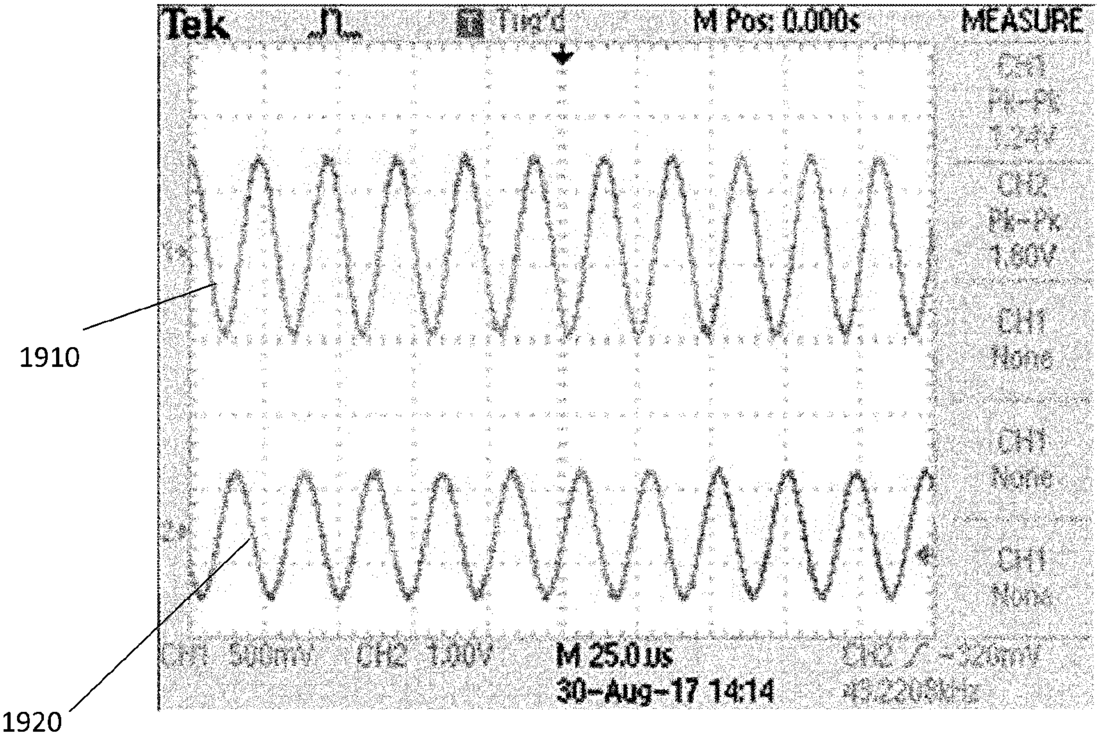
FIG. 19 is an image of an oscilloscope screen when testing the uniform-thickness transducer at 36V excitation voltage and 43.22 KHz where channel one shows the output signal of the microphone and channel two is the input excitation voltage.
Figure 20:
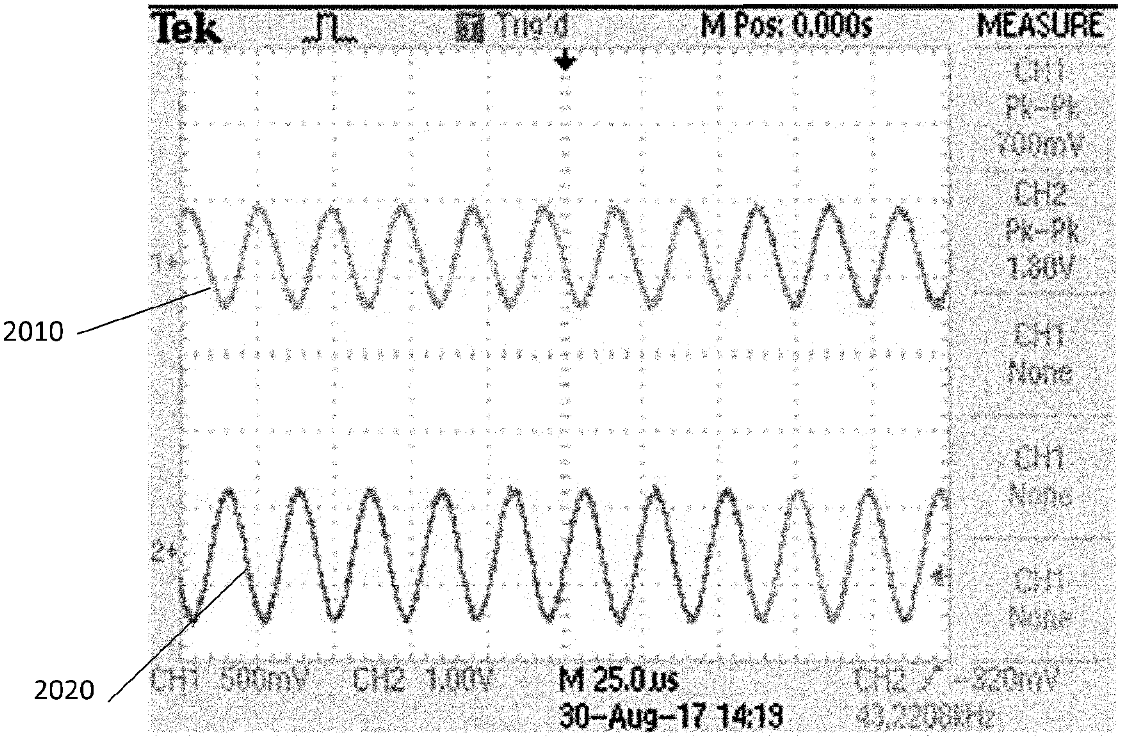
FIG. 20 is an image of an oscilloscope screen when testing the uniform-thickness transducer at 36V excitation voltage and 43.22 KHz with the microphone pulled further out of the transducer, channel one shows the output signal of the microphone and channel two is the input excitation voltage.

In order to check the uniformity of the generated acoustic field inside the transducer, the tests were repeated again with the microphone positioned approximately in the mid-length of the transducer and in the other trial it was pulled a little out. In both cases, the frequency was the same and only the microphone position was varied. These are illustrated in FIGS. 19 and 20 that show images 1901, 2001 of oscilloscope screens. As evident, the output voltages of the microphone 1910, 2010 are 1240 mV and 700 mV, respectively. These values correspond to 161.89 dB and 156.92 dB. These also correspond to 2480.28 Pa and 1399.59 Pa. Thus, the acoustic field is nearly uniform along the length of the transducer, although it gets a little bit weaker moving towards the end of the tube.

Tests on Stepped-Thickness Piezoelectric Tube

Figure 21:
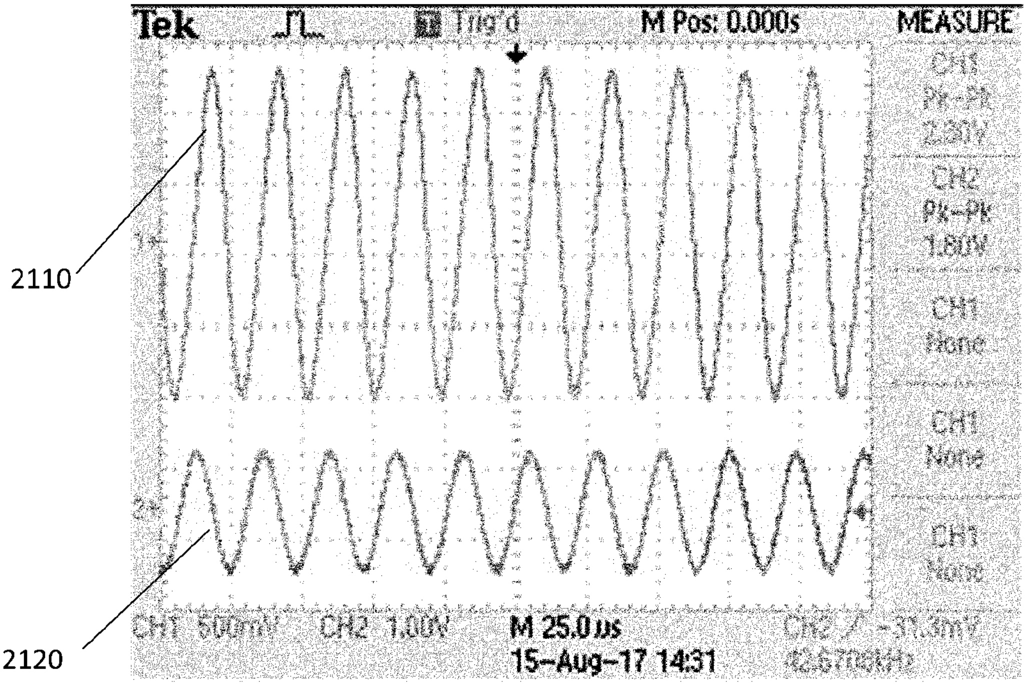
FIG. 21 is an image of an oscilloscope screen when testing the exemplary stepped-thickness transducer at 36V excitation voltage and 42.67 KHz where channel one shows the output signal of the microphone and channel two is the input excitation voltage.

In FIG. 21, an image of an oscilloscope screen 2101 is shown, the input voltage 2120 to the amplifier is 1.80V (Channel 2 of the oscilloscope) which equals 36V applied to the transducer because of the gain of the amplifier which is 20. The output of the microphone 2110 (Channel 1 of the oscilloscope) in this case is 2.3V. Using Equation (1) the output is 167.25 dB corresponding to the pressure of approx. 4597.27 Pa using equation (2). The average output current of the piezo driver for the selected voltage jumper was 250 mA according to its catalog and the applied voltage was 36V peak-to-peak corresponding to 25.452V root mean square. Therefore, the average power delivered to the transducer will be approx. 4.5 Watts.

Figure 22:
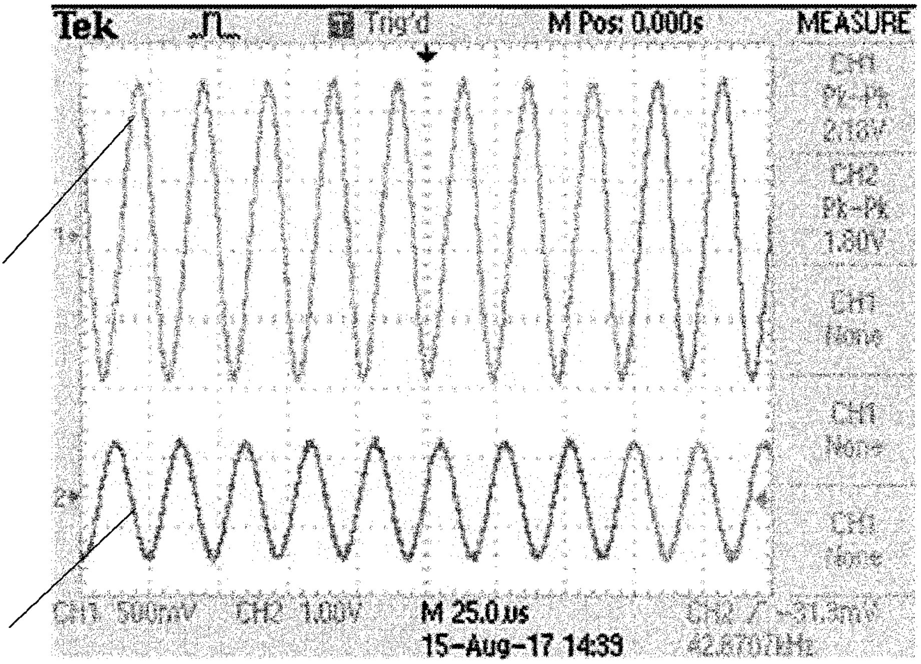
FIG. 22 is an image of an oscilloscope screen when testing the exemplary stepped stepped-thickness transducer at 36V excitation voltage and 42.67 KHz with the microphone pulled further out of the transducer, channel one shows the output signal of the microphone and channel two is the input excitation voltage.

In order to check the uniformity of the generated acoustic field inside the transducer, the microphone was positioned approximately in the mid-length of the transducer and in the other trial it was pulled a little out. These are illustrated in FIGS. 21 and 22 that show images 2101, 2201 of oscilloscope screens. As evident, the output voltages 2110, 2210 of the microphone are 2.3V and 2.18V, respectively. These values correspond to 167.25 dB and 166.79 dB.

Thus, the acoustic field for the stepped thickness piezoelectric tube is quite uniform along the length and especially very high along the grooved region. This can be due to the mode of vibration and larger deformation of grooved regions of the transducer and suitable constructive interference at the center line. Moreover, it can be concluded that the stepped thickness transducer generates a stronger acoustic field compared to the uniform-thickness transducer in all the regions and along its whole length.

Therefore, the stepped-thickness piezoelectric tube produces a stronger acoustic field than the uniform-thickness one. In the test results 4597.27 Pa compared to 2480.28 Pa for the uniform-thickness tube or the microphone output of 2.3V compared to 1240 mV. This is approximately an 85% increase in the sound pressure level for the same power input. As discussed, increasing the excitation voltage can increase the strength of the acoustic field of the standard uniform-thickness tube by approximately 32% from 740 mV to 980 mV. However, to obtain the increase, power consumption is increased by 50% from 3 to 4.5 Watts. Thus, the stepped tube of the present invention provides a better alternative.

Potential applications for the proposed stepped thickness shell transducer include but are not limited to humidifiers, drug delivery devices and particle separators. The proposed transducer can be customised for any of the mentioned applications by suitable tuning and possible downsizing or upsizing.

However, the methodology and concept behind the device and acoustic amplification using geometrical manipulations discussed above will remain the same. Average power consumption of the exemplary stepped thickness shell transducer is around 4.5 Watts at 36V input and the output sound pressure level is intensified by introducing the designed grooves.

The stepped thickness shell transducer 101 was tested as a humidifier to reduce the size of water droplets. Input water droplets were supplied to the transducer using current available atomizers. Various tests were performed using the exemplary stepped thickness shell ultrasound transducer at 36V input and approx. 165 dB and 4.5 Watts. Tests were performed several times and in two cases with the ultrasound transducer on and off. On average, there was a reduction of 0.5-1.5 μm in the diameter of 90% of the droplets in different trials.

Further to drive and keep the transducer at its resonance, a dynamic resonance controller could be used.

When creating or reducing the size of droplets, the transducer 101 affects the droplets inside the transducer tube not outside, thus the flow of droplets is inside the transducer 101 tube. The sharp edges of the steps amplify the waves.

When using the stepped thickness shell transducer 101 the flow of the liquid is not on the surface; it is not necessary for the liquid to touch the steps of the transducer. Typically, the droplets take a more or less straight path through the transducer 101 and do not need to bend. While a force gas may be used to drive droplets through transducer 101 it is not necessary to use a forced gas flow through the transducer 101 if drops are introduced with enough momentum. In such a situation, droplets would be carried through the transducer and create their own air flow.

Further when transducer 101 is used to separate droplets it may do so without the use of a separator plate. Unlike an array of plate transducers, the stepped tube transducer 101 only requires one piezo driver and element to generate the concentrated sound.

In a further application the transducer 101 can also be used for pasteurisation where there may be another (solid) conductor of the ultrasound waves between the target. Such a conductor may be a lining as discussed above. Alternatively, the conductor between the transducer 101 and the target material which is typically a liquid, may be a gas.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A method of atomizing a liquid comprising using a droplet generator and a cylindrical piezoelectric transducer, the cylindrical piezoelectric transducer comprising:

a tube having inner and outer surfaces and a first inner diameter, first outer diameter and a first thickness;

at least one stepped band having a stepped inner diameter, stepped outer diameter and stepped thickness and wherein the stepped thickness is less than the first thickness and the at least one stepped band is spaced along the length of the tube; and a conductive layer disposed over the inner and outer surfaces of the tube, the method further comprising feeding a plurality of liquid droplets of a first size from the droplet generator through the cylindrical piezoelectric transducer to reduce the size of the plurality of liquid droplets of the first size, wherein the plurality of liquid droplets of the first size are reduced in size.

2. The method of claim 1 wherein the liquid is water.

3. A humidifier comprising:

a droplet generator, the droplet generator creating a plurality of droplets of a first size; and a cylindrical piezoelectric transducer, the cylindrical piezoelectric transducer comprising:

a tube having inner and outer surfaces and a first inner diameter, first outer diameter and a first thickness;

at least one stepped band having a stepped inner diameter, stepped outer diameter and stepped thickness and wherein the stepped thickness is less than the first thickness and the at least one stepped band is spaced along the length of the tube; and a conductive layer disposed over the inner and outer surfaces of the tube, wherein the plurality of droplets of the first size from the droplet generator are fed through the cylindrical piezoelectric transducer and the plurality of droplets of the first size are reduced in size.

4. A method of atomizing a liquid comprising using a droplet generator and a cylindrical piezoelectric transducer, the cylindrical piezoelectric transducer comprising:

a tube having inner and outer surfaces and a first inner diameter, first outer diameter and a first thickness;

at least one stepped band having a stepped inner diameter, stepped outer diameter and stepped thickness and wherein at least one of the stepped inner diameter, stepped outer diameter and stepped thickness differ from the respective first inner diameter, first outer diameter and first thickness; and a conductive layer disposed over the inner and outer surfaces of the tube, the method further comprising feeding a plurality of liquid droplets of a first size from the droplet generator through the cylindrical piezoelectric transducer to reduce the size of the plurality of liquid droplets of the first size, wherein the plurality of liquid droplets of the first size are reduced in size.

5. The method of claim 4 wherein the liquid is water.

6. A humidifier comprising:

a droplet generator, the droplet generator creating a plurality of droplets of a first size; and a cylindrical piezoelectric transducer, the cylindrical piezoelectric transducer comprising:

a tube having inner and outer surfaces and a first inner diameter, first outer diameter and a first thickness;

at least one stepped band having a stepped inner diameter, stepped outer diameter and stepped thickness and wherein at least one of the stepped inner diameter, stepped outer diameter and stepped thickness differ from the respective first inner diameter, first outer diameter and first thickness; and a conductive layer disposed over the inner and outer surfaces of the tube, wherein the plurality of droplets of the first size from the droplet generator are fed through the cylindrical piezoelectric transducer and the plurality of droplets of the first size are reduced in size.

7. An apparatus for creating a plurality of liquid droplets comprising:

a droplet generator, the droplet generator creating a plurality of liquid droplets of a first size; and a cylindrical piezoelectric transducer comprising:

a tube having inner and outer surfaces and a first inner diameter, first outer diameter and a first thickness;

at least one stepped band having a stepped inner diameter, stepped outer diameter and stepped thickness and wherein the stepped thickness is less than the first thickness and the at least one stepped band is spaced along the length of the tube; and a conductive layer disposed over the inner and outer surfaces of the tube, wherein the plurality of liquid droplets of the first size from the droplet generator are fed through the cylindrical piezoelectric transducer and the plurality of liquid droplets of the first size are reduced in size.

8. The apparatus of claim 7 wherein the droplet generator is selected from the group comprising a plate atomizer, a mesh nebulizer and a spray nozzle.

9. The apparatus of claim 7 further comprising at least one further cylindrical piezoelectric transducer the at least one further cylindrical piezoelectric transducer being arranged in series with the outlet of a previous cylindrical piezoelectric transducer being fed into a further cylindrical piezoelectric transducer.

10. An apparatus for creating a plurality of liquid droplets comprising:

a droplet generator, the droplet generator creating a plurality of liquid droplets of a first size; and a cylindrical piezoelectric transducer comprising:

a tube having inner and outer surfaces and a first inner diameter, first outer diameter and a first thickness;

at least one stepped band having a stepped inner diameter, stepped outer diameter and stepped thickness and wherein at least one of the stepped inner diameter, stepped outer diameter and stepped thickness differ from the respective first inner diameter, first outer diameter and first thickness; and a conductive layer disposed over the inner and outer surfaces of the tube, wherein the plurality of liquid droplets of the first size from the droplet generator are fed through the cylindrical piezoelectric transducer and the plurality of liquid droplets of the first size are reduced in size.

11. The apparatus of claim 10 wherein the droplet generator is selected from the group comprising a plate atomizer, a mesh nebulizer and a spray nozzle.

12. The apparatus of claim 10 further comprising at least one further cylindrical piezoelectric transducer the at least one further cylindrical piezoelectric transducer being arranged in series with the outlet of a previous cylindrical piezoelectric transducer being fed into a further cylindrical piezoelectric transducer.

13. The method of claim 1, wherein the droplet generator is selected from the group comprising a plate atomizer, a mesh nebulizer and a spray nozzle.

14. The method of claim 1, further comprising using at least one further cylindrical piezoelectric transducer the at least one further cylindrical piezoelectric transducers being arranged in series with the outlet of a previous cylindrical piezoelectric transducers being feed into a further cylindrical piezoelectric transducer.

15. The humidifier of claim 3, wherein the droplet generator is selected from the group comprising a plate atomizer, a mesh nebulizer and a spray nozzle.

16. The humidifier of claim 3, further comprising at least one further cylindrical piezoelectric transducer the at least one further cylindrical piezoelectric transducers being arranged in series with the outlet of a previous cylindrical piezoelectric transducers being feed into a further cylindrical piezoelectric transducer.

17. The method of claim 4, wherein the droplet generator is selected from the group comprising a plate atomizer, a mesh nebulizer and a spray nozzle.

18. The method of claim 4, further comprising using at least one further cylindrical piezoelectric transducer the at least one further cylindrical piezoelectric transducers being arranged in series with the outlet of a previous cylindrical piezoelectric transducers being feed into a further cylindrical piezoelectric transducer.

19. The humidifier of claim 6, wherein the droplet generator is selected from the group comprising a plate atomizer, a mesh nebulizer and a spray nozzle.

20. The humidifier of claim 6, further comprising at least one further cylindrical piezoelectric transducer the at least one further cylindrical piezoelectric transducers being arranged in series with the outlet of a previous cylindrical piezoelectric transducers being feed into a further cylindrical piezoelectric transducer.

* * * * *